(12) United States Patent
Andrew et al.

(10) Patent No.: US 9,671,128 B2
(45) Date of Patent: Jun. 6, 2017

(54) AIR CONDITIONER HAVING ANGLED HEAT EXCHANGERS

(71) Applicant: Airedale International Air Conditioning Limited, Leeds, West Yorkshire (GB)

(72) Inventors: David Andrew, Leeds (GB); David Wilks, Leeds (GB); Anthony Hoare, Wetherby (GB); Patrick Cotton, Leeds (GB); Andrew Walker, Harrogate (GB)

(73) Assignee: Airedale International Air Conditioning Limited, West Yorkshire (GB)

( * ) Notice: Subject to any disclaimer, the term of this patent is extended or adjusted under 35 U.S.C. 154(b) by 215 days.

(21) Appl. No.: 14/380,127

(22) PCT Filed: May 29, 2014

(86) PCT No.: PCT/GB2014/051635
§ 371 (c)(1),
(2) Date: Aug. 21, 2014

(87) PCT Pub. No.: WO2014/207434
PCT Pub. Date: Dec. 31, 2014

(65) Prior Publication Data
US 2016/0238276 A1    Aug. 18, 2016

(51) Int. Cl.
*B01D 47/00* (2006.01)
*B01D 49/00* (2006.01)
(Continued)

(52) U.S. Cl.
CPC ............ *F24F 13/30* (2013.01); *B01D 46/125* (2013.01); *B01D 46/4263* (2013.01);
(Continued)

(58) Field of Classification Search
CPC ........ B01D 47/00; B01D 49/00; B01D 51/00; B01D 46/00; B01D 50/00; B01D 45/00;
(Continued)

(56) References Cited

U.S. PATENT DOCUMENTS 5,758,719 A * 6/1998 Yoshihashi ........... F24F 1/0007
165/119
6,171,376 B1 * 1/2001 Hironaka .................. B03C 3/32
55/282.3
(Continued)

FOREIGN PATENT DOCUMENTS

CA      2140404 A1    7/1996
CN      101440979     5/2009
(Continued)

OTHER PUBLICATIONS

Combined Search and Examination Report from the United Kingdom for Application No. GB1311190.1 dated Oct. 27, 2014 (11 pages).
(Continued)

Primary Examiner — Jacob T Minskey
Assistant Examiner — Minh-Chau Pham
(74) Attorney, Agent, or Firm — Michael Best & Friedrich LLP

(57) ABSTRACT

An air conditioner including a frame, a fan operable to generate an airflow that moves in an airflow direction, and a first heat exchanger including a first end adjacent the air inlet, a second end adjacent the air outlet, an air inlet face that extends between the first end and the second end, an air outlet face that extends between the first end and the second end and faces opposite the air inlet face, and a longitudinal axis that extends through the first end and the second end between the air inlet face and the air outlet face. The heat exchanger is configured to transfer heat between the airflow (Continued)

and a cooling medium. A first heat exchanger angle is defined between the longitudinal axis of the heat exchanger and the airflow direction, and the first heat exchanger angle can be between about 3 degrees and about 20 degrees.

25 Claims, 7 Drawing Sheets

(51) Int. Cl.
*B01D 51/00* (2006.01)
*B01D 46/00* (2006.01)
*B01D 50/00* (2006.01)
*B01D 45/00* (2006.01)
*B01D 53/00* (2006.01)
*B01D 57/00* (2006.01)
*B01D 59/00* (2006.01)
*F25D 17/04* (2006.01)
*F24F 13/30* (2006.01)
*F24F 1/00* (2011.01)
*B01D 46/12* (2006.01)
*B01D 46/42* (2006.01)
*F24F 13/28* (2006.01)

(52) U.S. Cl.
CPC .......... *F24F 1/0007* (2013.01); *F24F 1/0059* (2013.01); *F24F 13/28* (2013.01)

(58) Field of Classification Search
CPC ........ B01D 53/00; B01D 57/00; B01D 59/00; F25D 17/04
USPC .............. 55/282.2, 295, 296, 471, 472, 473; 62/293, 317; 165/119
See application file for complete search history.

(56) References Cited

U.S. PATENT DOCUMENTS

| | | | |
|---|---|---|---|
| 6,435,265 B1 | 8/2002 | Lakdawala et al. | |
| 6,817,199 B2 | 11/2004 | Patel et al. | |
| 6,832,489 B2 | 12/2004 | Bash et al. | |
| 6,854,287 B2 | 2/2005 | Patel et al. | |
| 6,886,353 B2 | 5/2005 | Patel et al. | |
| 7,165,412 B1 | 1/2007 | Bean, Jr. | |
| 7,349,209 B2 | 3/2008 | Campbell et al. | |
| 7,418,825 B1 | 9/2008 | Bean, Jr. | |
| 7,486,511 B1 | 2/2009 | Griffel et al. | |
| 7,486,512 B2 | 2/2009 | Campbell et al. | |
| 7,752,858 B2 | 7/2010 | Johnson et al. | |
| 8,009,430 B2 | 8/2011 | Claassen et al. | |
| 8,197,124 B2 | 6/2012 | Claassen et al. | |
| 8,203,837 B2 | 6/2012 | Zeighami et al. | |
| 8,209,993 B2 | 7/2012 | Carlson et al. | |
| 8,233,274 B2 | 7/2012 | Archibald et al. | |
| 8,270,161 B2 | 9/2012 | Archibald et al. | |
| 8,286,442 B2 | 10/2012 | Carlson et al. | |
| 2004/0000160 A1* | 1/2004 | Takashima | B01D 46/002 62/317 |
| 2005/0284168 A1* | 12/2005 | Lee | F24F 1/0007 62/317 |
| 2006/0070358 A1* | 4/2006 | Oda | F24F 1/0007 55/295 |
| 2006/0096459 A1* | 5/2006 | Iwano | F24F 3/1603 96/224 |
| 2009/0183471 A1* | 7/2009 | Shibuya | B01D 46/0065 55/282.2 |
| 2016/0097547 A1* | 4/2016 | Selg | F24F 13/20 62/293 |

FOREIGN PATENT DOCUMENTS

| | | |
|---|---|---|
| CN | 201844475 | 5/2011 |
| CN | 201992742 | 9/2011 |
| CN | 102308153 | 1/2012 |
| CN | 203010774 U | 6/2013 |
| EP | 2395290 A1 | 12/2011 |
| EP | 2461111 | 6/2012 |
| JP | 2005106337 | 4/2005 |
| JP | 2011163670 | 8/2011 |
| JP | 2011202821 A | 10/2011 |
| KR | 1020010093371 | 10/2001 |
| KR | 1020070097398 | 10/2007 |
| KR | 1020070098983 | 10/2007 |
| WO | 2012094806 A1 | 7/2012 |
| WO | 2013019113 A1 | 2/2013 |
| WO | 2013190487 | 12/2013 |

OTHER PUBLICATIONS

Examination Report from the United Kingdom for Application No. GB1311190.1 dated Nov. 9, 2015 (3 pages).
PCT Search Report and Written Opinion for PCT Application No. PCT/GB2014/051635 dated Aug. 7, 2014 (10 pages).
Admitted prior art "Flexible, High Efficiency Cooling Solutions", Airedale Applied Thermal Innovation, www.airedale.com, pp. 1-12, Leeds, England.
Admitted prior art "Pull the Plug on Excess Data Center Costs", Power and Cooling, pp. 56-59.
Admitted prior art "Precision Air Conditioning: Taking Efficiency Even Further", Airedale Applied Thermal Innovation, www.airedale.com, pp. 1-16, Leeds, England.
Search and Examination Report from the Intellectual Property Office of the United Kingdom for Application No. 1611941.4 dated Jul. 28, 2016 (3 pages).
First Office Action from the State Intellectual Property Office of the People's Republic of China for Application No. 201490000841.6 dated Apr. 13, 2016 (12 pages).

* cited by examiner

AIR CONDITIONER HAVING ANGLED HEAT EXCHANGERS

BACKGROUND

The present invention relates to air conditioners.

A number of systems have been developed and are in use for cooling rooms used for various purposes ranging from occupant comfort to providing equipment with desired operating environments. Such systems typically include an air conditioner located inside the room, and a heat rejection portion of the system located outside of the room. Chiller systems are examples of such cooling systems, and provide a flow of chilled water from the heat rejection portion of the system to the air conditioner inside the room as a cooling medium. Heat can be rejected from the cooling medium directly to the outside air (so-called "free cooling"), and/or to a secondary cooling medium loop such as a cooling tower loop or a vapor compression system refrigerant loop. In other systems the cooling medium itself can be a flow of refrigerant from a vapor compression system. The air conditioner transfers heat between the relatively hot air inside the room and the cooling medium. After transferring heat between the cooling medium and the air, the cooling medium is returned to the equipment located outside the room to be cooled again.

An example of an application for such air conditioning systems is cooling systems used to control the temperature of data center rooms. Data center rooms may house computer equipment, such as servers, networking gear, storage systems, and the like, that generate heat. The heat produced by this computer equipment must be removed from the room in order to avoid raising the temperature of the computer equipment above an undesirable level. The removal of this heat can be accomplished by directing cooled air from the data center room over the computer equipment in order to remove the generated heat from the computer equipment, then re-cooling the heated air to maintain a flow of cooled air. Air conditioning systems capable of performing this function within a relatively small space and in an efficient manner continue to be welcome additions to the art in data center room and other applications.

SUMMARY

In some embodiments, an air conditioner is provided, and includes a frame at least partially defining an air inlet and an air outlet, the frame including an upper end and a lower end, the lower end configured to support the frame on a support surface. The air conditioner further includes a fan operable to generate an airflow that moves in an airflow direction from the air inlet to the air outlet, and a first heat exchanger including a first end adjacent the air inlet, a second end adjacent the air outlet, an air inlet face that extends between the first end and the second end, an air outlet face that extends between the first end and the second end and faces opposite the air inlet face, and a longitudinal axis that extends through the first end and the second end between the air inlet face and the air outlet face. The heat exchanger is configured to transfer heat between the airflow and a cooling medium. A first heat exchanger angle is defined between the longitudinal axis of the heat exchanger and the airflow direction, and the first heat exchanger angle is between about 3 degrees and about 20 degrees.

Some embodiments provide an air conditioner including a frame at least partially defining an air inlet and an air outlet, the frame including an upper end, a lower end opposite the upper end, and a longitudinal axis that extends through the upper end and the lower end, the lower end configured to support the frame on a support surface such that the longitudinal axis is perpendicular to the support surface. The air conditioner further includes a fan operable to generate an airflow that moves in an airflow direction from the air inlet to the air outlet, and a heat exchanger including a first end adjacent the air inlet, a second end adjacent the air outlet, an air inlet face that extends between the first end and the second end, an air outlet face that extends between the first end and the second end and faces opposite the air inlet face, and a longitudinal axis that extends through the first end and the second end and between the air inlet face and the air outlet face. The first heat exchanger is configured to transfer heat between the airflow and a cooling medium. A first heat exchanger angle is defined between the longitudinal axis of the heat exchanger and the longitudinal axis of the frame, and the first heat exchanger angle is between about 3 degrees and about 20 degrees.

In some embodiments, the invention provides a modular air conditioner system including a fan operable to generate an airflow and first and second sets of heat exchangers, each heat exchanger of the first and second sets is oriented at no less than about 3 degrees and no greater than about 20 degrees from a vertical plane and having an air inlet face into which the airflow enters the heat exchanger, and an air outlet face opposite the air inlet face and from which the airflow exits the heat exchanger. The system further includes a frame at least partially defining an air inlet and an air outlet, the frame including an upper end, a lower end opposite the upper end, a front, a rear opposite the front, lateral sides extending between and connecting the front and rear, an interior defined at least in part between the front and the rear of the frame and within which the heat exchangers are located, and a door at the front through which access to the interior of the frame is provided. The system further includes a first modular configuration in which the frame has a first width defined by and between the lateral sides of the frame and in which only the first set of heat exchangers is installed and in which the heat exchangers of the first set are arranged side-by-side with the air inlet and outlet faces of each heat exchanger substantially facing the lateral sides of the frame, and a second modular configuration in which the frame has a second width that is defined by and between the lateral sides of the frame and that is greater than the first width to accommodate both the first and second sets of heat exchangers. In the second configuration, the heat exchangers of the first and second sets are arranged side-by-side with the air inlet and outlet faces of each heat exchanger substantially facing the lateral sides of the frame.

Some embodiments of the present invention provide an air conditioner including a frame at least partially defining an air inlet and an air outlet, the frame including an upper end, a lower end opposite the upper end, a front, a rear opposite the front, opposite lateral sides extending between and connecting the front and the rear to define a width of the frame, and a longitudinal axis that extends through the upper end and the lower end, the lower end configured to support the frame on a support surface such that the longitudinal axis is perpendicular to the support surface. The air conditioner further includes a fan operable to generate an airflow that moves in an airflow direction from the inlet to the outlet, and a plurality of heat exchangers each including a first end adjacent the air inlet, a second end adjacent the air outlet, an air inlet face that extends between the first end and the second end, an air outlet face that extends between the first end and the second end and faces opposite the air inlet face, and a longitudinal axis that extends through the first end and the second end and between the air inlet face and the air outlet face, each heat exchanger configured to transfer heat between the airflow and a cooling medium. Each heat exchanger is inclined with respect to the longitudinal axis of the frame, and the heat exchangers are arranged side-by-side with the air inlet and outlet faces of each heat exchanger substantially facing the lateral sides of the frame, and the plurality of heat exchangers includes at least one heat exchanger per 350 millimeters of width across the frame.

Other aspects of the invention will become apparent by consideration of the detailed description and accompanying drawings.

Before any embodiments of the invention are explained in detail, it is to be understood that the invention is not limited in its application to the details of construction and the arrangement of components set forth in the following description or illustrated in the accompanying drawings. The invention is capable of other embodiments and of being practiced or of being carried out in various ways.

DETAILED DESCRIPTION

Figure 1:
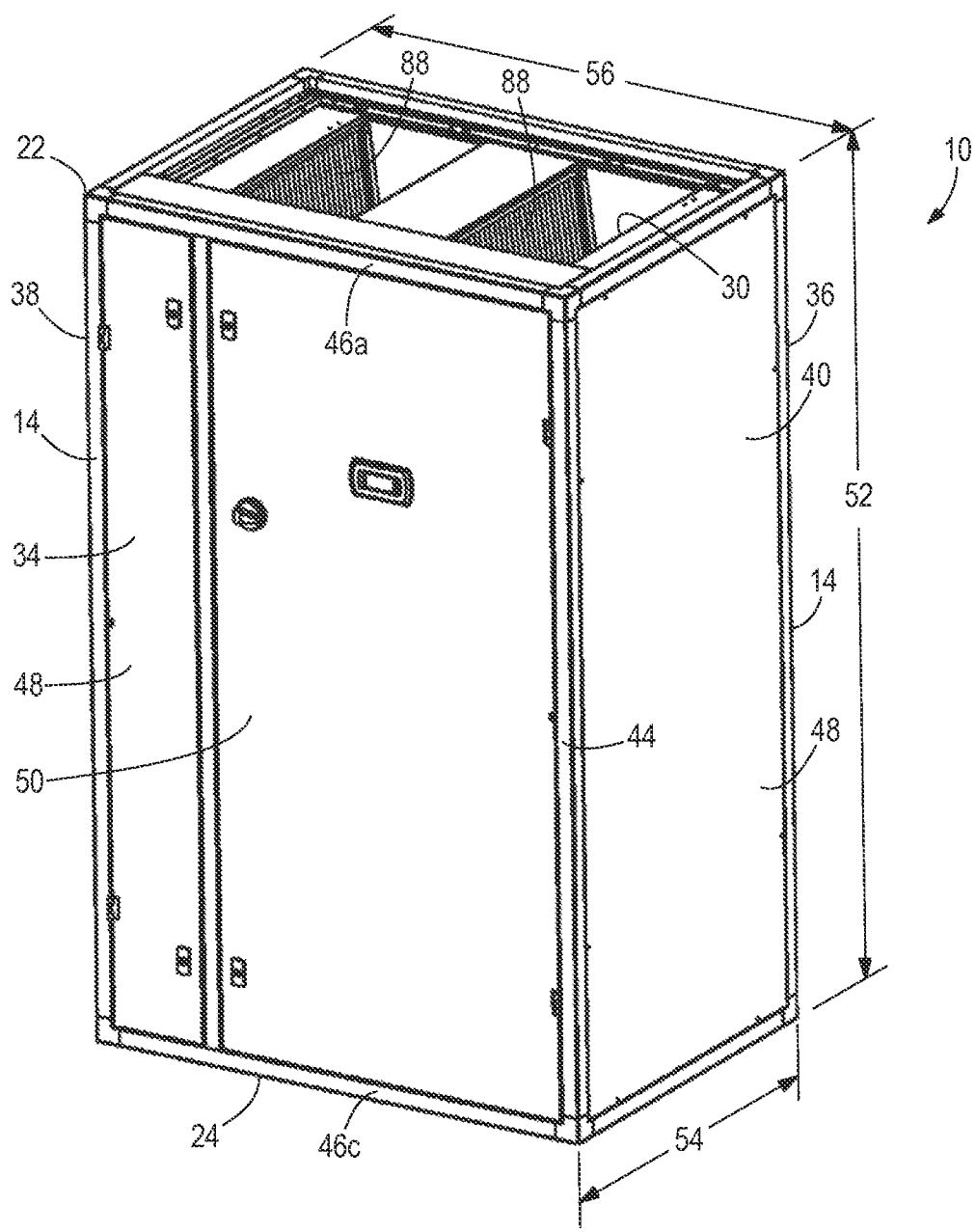
FIG. 1 is a perspective view of an air conditioner according to an embodiment of the invention.

FIG. 1 illustrates an air conditioner 10. In some embodiments, the air conditioner 10 can be used with a chiller system to cool a data center room. For example, the chiller system can include the air conditioner 10 located within the data center room and other equipment (e.g., evaporator, condenser, compressor, cooling tower, etc.) located outside the room that supply a cooling medium, such as chilled water, to the air conditioner 10 for cooling the data center room.

Figure 2:
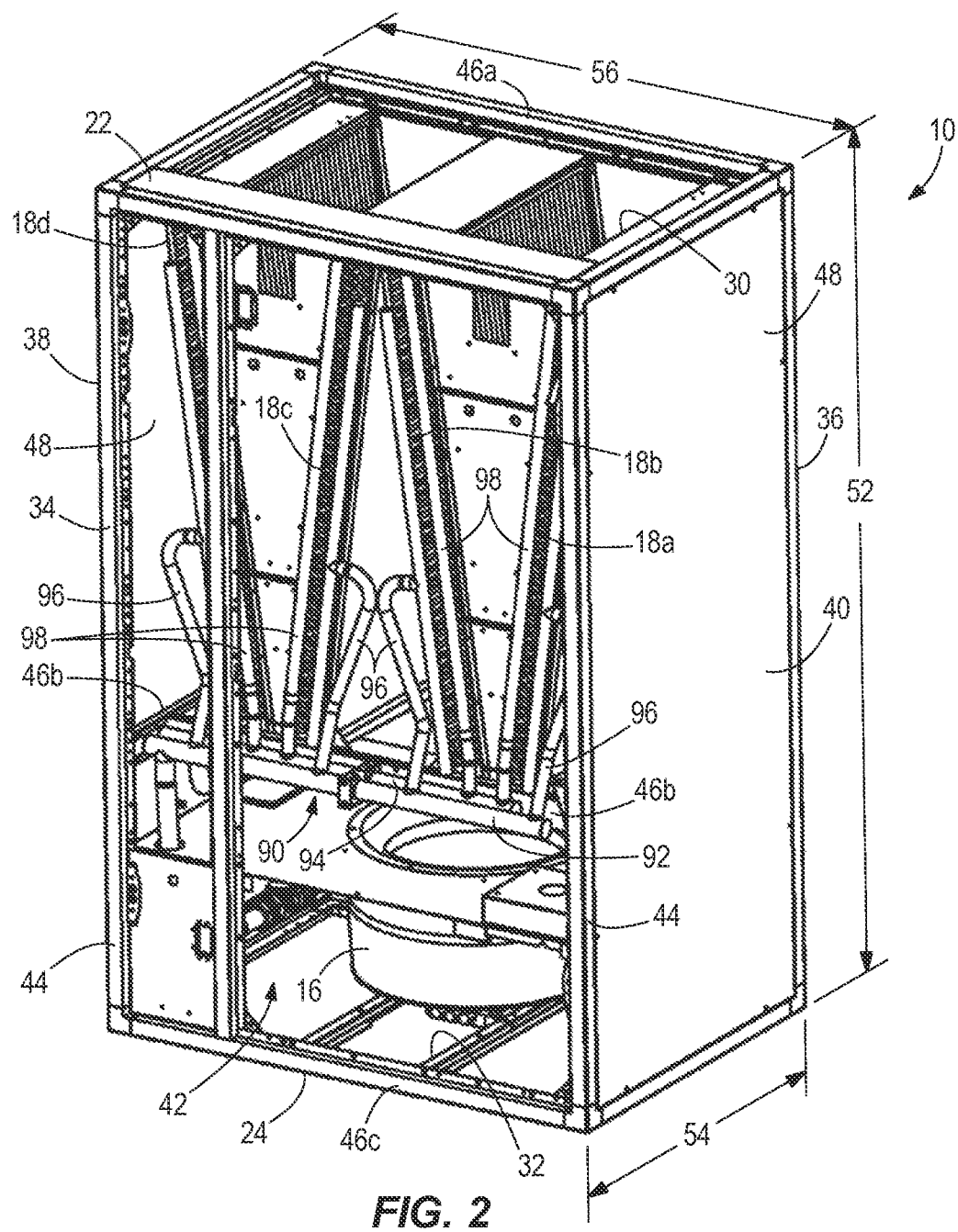
FIG. 2 is a perspective view of the air conditioner of FIG. 1 with a front panel and a door removed.
Figure 3:
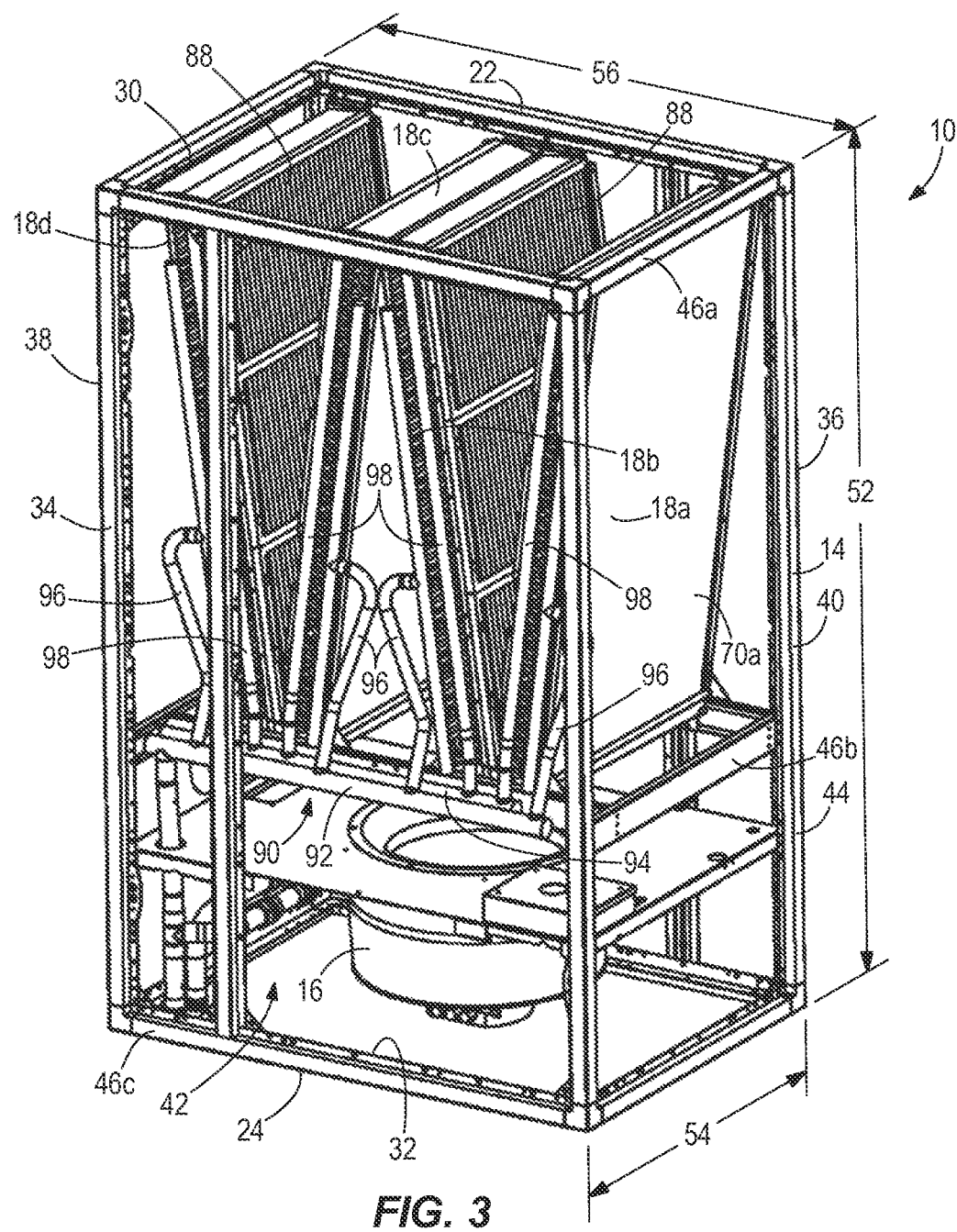
FIG. 3 is a perspective view of the air conditioner of FIG. 1 with the front panel, the door, and side panels removed.

Referring to FIG. 2, the illustrated air conditioner 10 includes a frame 14, a fan 16, and heat exchangers 18a, 18b, 18c, and 18d. As will be discussed in more detail below, although the illustrated air conditioner 10 includes four heat exchangers 18a-18d, in other configurations the air conditioner 10 can include more than four heat exchangers or fewer than four heat exchangers, such as in applications where the air conditioner 10 is part of a modular air conditioner system.

Figure 4:
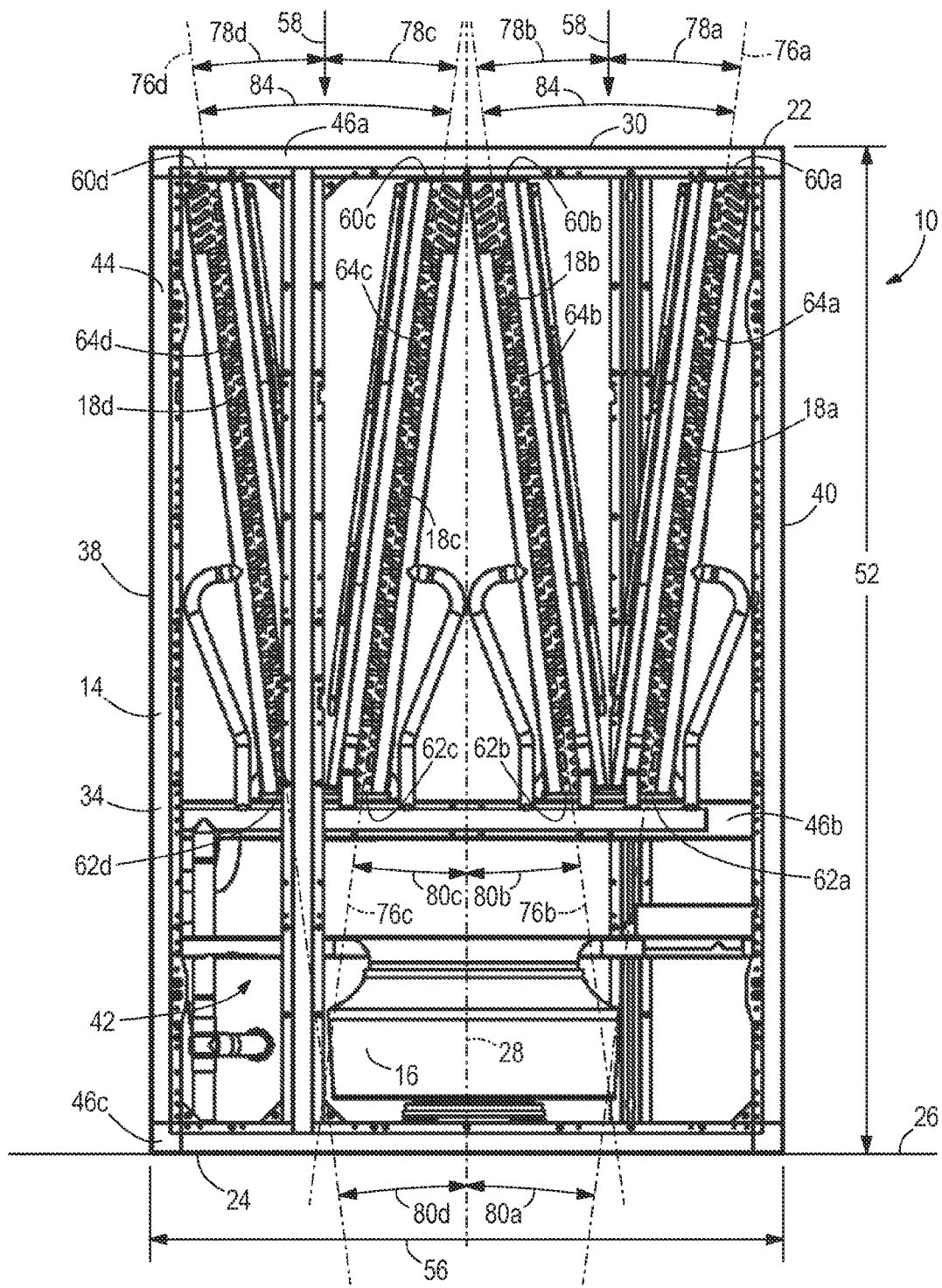
FIG. 4 is a front side view of the air conditioner of FIG. 1 with the front panel and the door removed.

With continued reference to FIG. 2, the frame 14 includes an upper end 22 and a lower end 24 that supports the frame 14 on a support surface 26 (FIG. 4), such as the floor of a data center room. Referring to FIG. 4, the frame 14 defines a longitudinal axis 28 that extends centrally through the upper end 22 and the lower end 24 perpendicular to the support surface 26. Referring to FIG. 2, the frame 14 further defines an air inlet 30 and an air outlet 32. In the illustrated embodiment, the air inlet 30 is located at the upper end 22 of the frame 14 and the air outlet 32 is located at the lower end 24 of the frame 14. In other embodiments, the air outlet 32 can be located at the upper end 22 of the frame 14 and the air inlet 30 can be located at the lower end 24 of the frame 14. In yet other embodiments, the air inlet and air outlet can be located at other suitable locations. By way of example, one or both of the air inlet and air outlet can be provided in the frame by a ducted connection, or by one or more apertures disposed in the panels 48 described below.

The frame 14 further includes a front 34, a rear 36, and lateral sides 38 and 40 that connect the front 34 and the rear 36. An interior 42 of the frame 14 is defined by the front 34, the rear 36, and the sides 38 and 40 of the frame 14. The illustrated frame 14 further includes vertical rails or frame members 44 and horizontal rails or frame members 46a, 46b, and 46c. Panels 48 extend between the rails 44 and 46a, 46b, and 46c to enclose the interior 42 of the frame 14. A door 50 (FIG. 1) is located at the front 34 of the frame 14. The door 50 provides access to the interior 42 of the frame 14 and the heat exchangers 18a-18d located within the frame 14.

The frame 14 has a height 52, a depth 54, and a width 56. The height 52 is measured from the upper end 22 to the lower end 24, the depth 54 is measured from the front 34 to the rear 36, and the width 56 is measured from the lateral side 38 to the lateral side 40. In the illustrated embodiment, the vertical rails 44 extend parallel to the height 52 and the horizontal rails 46a, 46b, and 46c extend parallel to the width 56 and the depth 54.

Referring now to FIG. 4, the illustrated fan 16 is coupled to the frame 14 adjacent the lower end 24 of the frame 14 and the air outlet 32. The fan 16 is operable to generate an airflow that moves in an airflow direction represented by the arrows 58 in FIG. 4 from the air inlet 30 to the air outlet 32. While a single fan 16 is shown, it should be understood by those skilled in the art that in some systems multiple fans can be disposed in parallel in order to generate the airflow. In the illustrated embodiment, the airflow direction 58 is parallel to the longitudinal axis 28 of the frame 14. In other embodiments, the airflow direction 58 can be perpendicular to the longitudinal axis 28 of the frame 14. In still other embodiments, the angle between the airflow direction and the longitudinal axis of the frame can be any suitable angle.

Figure 5:
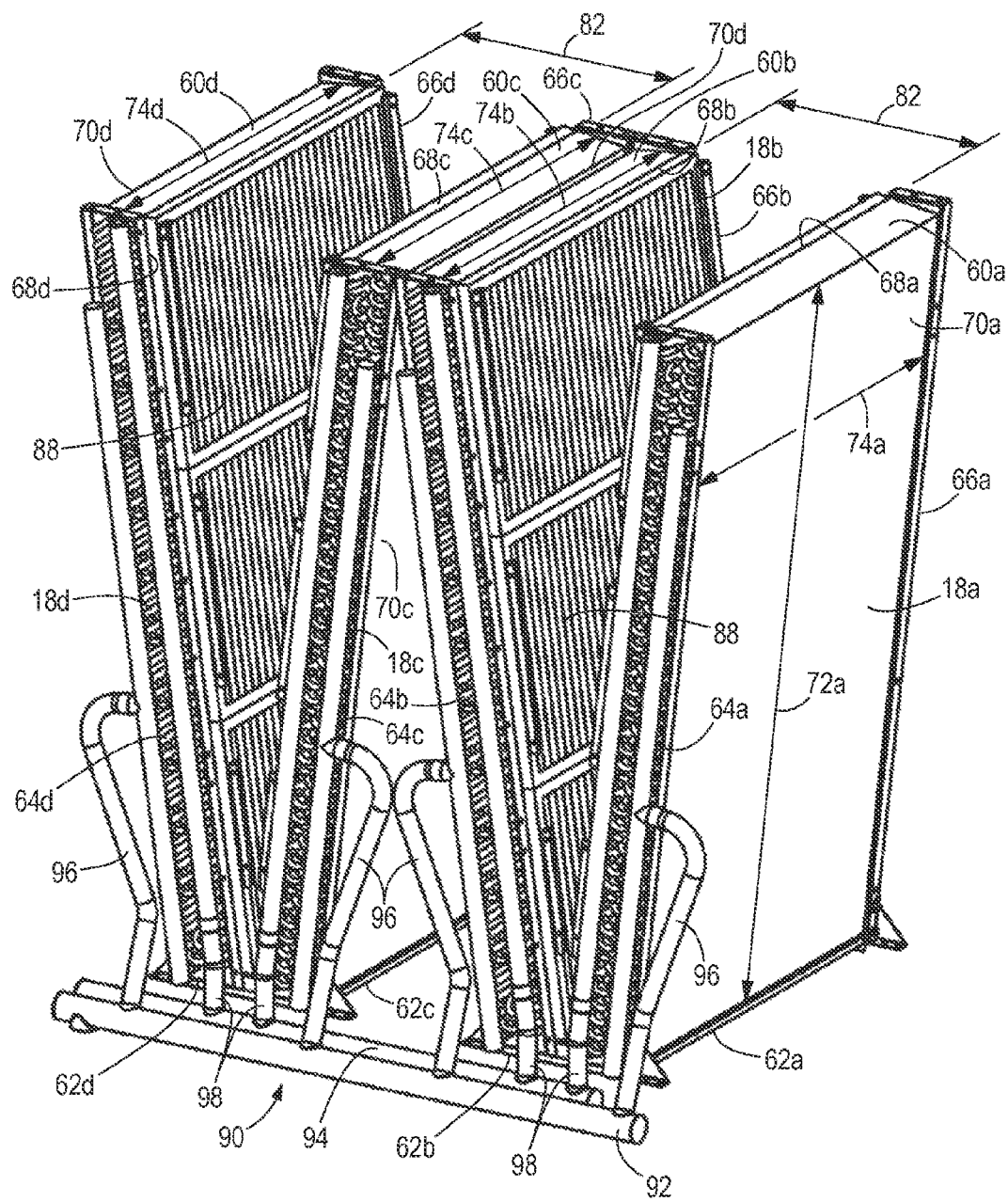
FIG. 5 is a perspective view of heat exchangers of the air conditioner of FIG. 1.
Figure 6:
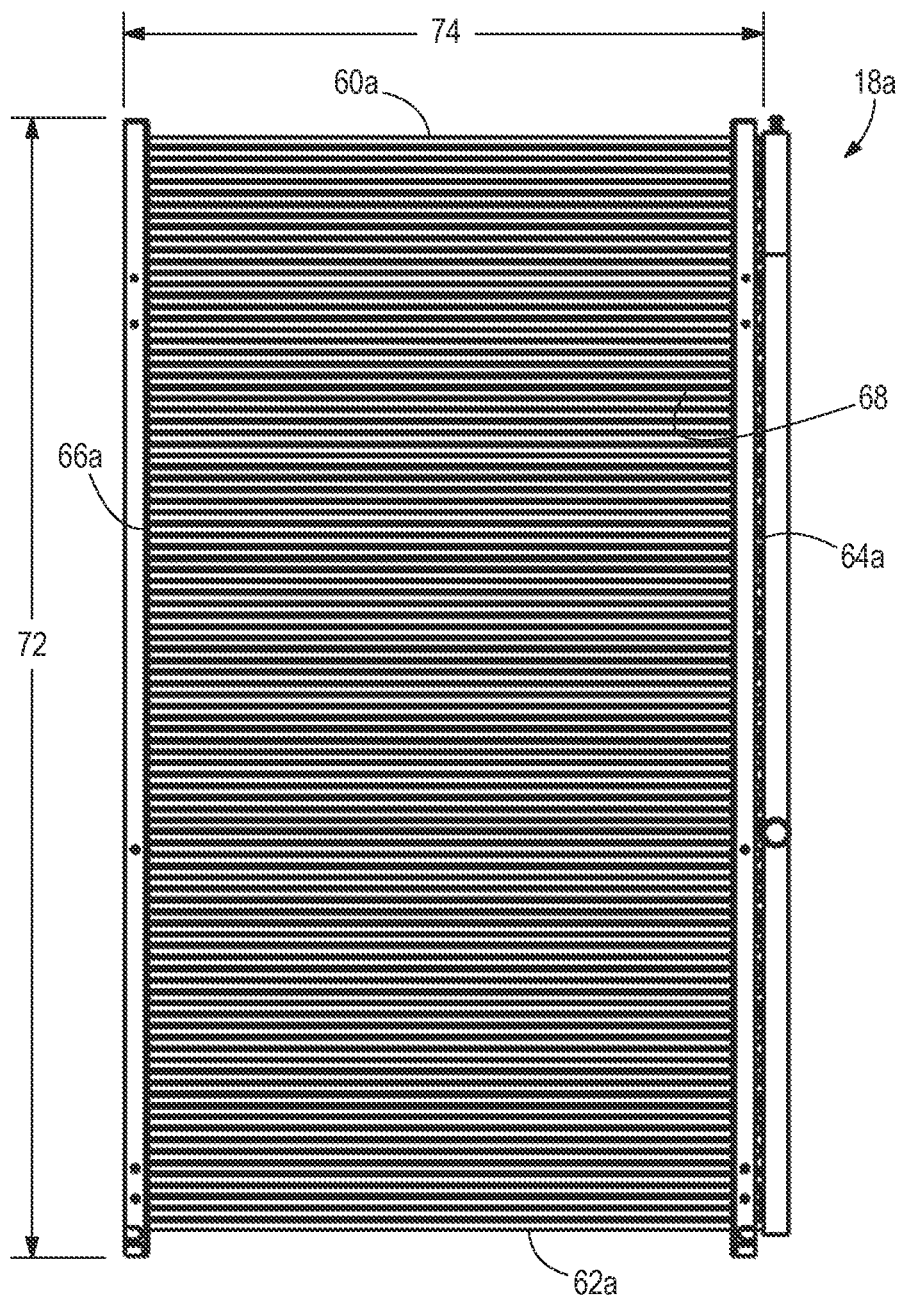
FIG. 6 is a side view of the heat exchangers of the air conditioner of FIG. 1.

Referring to FIGS. 4-6, in the illustrated embodiment, the heat exchangers 18a, 18b, 18c, and 18d are the same and therefore, only one of the heat exchangers 18a will be described in detail, with like components given like reference numbers with the suffix 'a,' 'b,' 'c,' or 'd' corresponding to the heat exchangers 18a, 18b, 18c, and 18d.

The heat exchanger 18a includes a first end 60a, a second end 62a, a first side 64a, and a second side 66a. The sides 64a, 66a extend from the end 60a to the end 62a. The first end 60a is adjacent or closest to the air inlet 30 of the air conditioner 10, and the second end 62a is adjacent or closest to the air outlet 32 of the air conditioner 10. The heat exchanger 18a further includes an air inlet face 68a into which the airflow 58 enters the heat exchanger 18a and an air outlet face 70a that faces opposite the air inlet face 68a and from which the airflow 58 exits the heat exchanger 18a. The air inlet face 68a extends between the first end 60a, the second end 62a, the first side 64a, and the second side 66a of the heat exchanger 18a on a first side of the heat exchanger 18a. An air inlet face area is defined as a length 72a of the air inlet face 68a (i.e., distance between ends 60a, 62a) multiplied by a width 74a of the air inlet face 68a (i.e., distance between sides 64a, 66a).

A longitudinal axis 76a (FIG. 4) of the heat exchanger 18a extends through the first end 60a and the second end 62a of the heat exchanger 18a midway between and parallel to the air inlet face 68a and the air outlet face 70a. The heat exchanger 18a is inclined with respect to the longitudinal axis 28 of the frame 14. Therefore, a first angle 78a is defined between the longitudinal axis 76a and the airflow direction 58. In some embodiments, the first angle 78a is also or instead defined between the longitudinal axis 76a and a vertical direction. In the illustrated embodiment, the first angle 78a is about 7.5 degrees. In other embodiments, the angle 78a is no less than about 5 degrees and/or is no greater than about 10 degrees. In yet other embodiments, the angle 78a is no less than about 3 degrees and/or is no greater than about 20 degrees. A second angle 80a is defined between the longitudinal axis 76a of the heat exchanger 18a and the longitudinal axis 28 of the frame 14. In the illustrated embodiment, the airflow direction 58 is parallel to the longitudinal axis 28 of the frame 14 and therefore, the angles 78a and 80a are equal. Therefore, the angle 80a is also about 7.5 degrees in the illustrated embodiment. In other embodiments, the angle 80a is no less than about 5 degrees and/or is no greater than about 10 degrees. In yet other embodiments, the angle 80a is no less than about 3 degrees and/or is no greater than about 20 degrees.

With continued reference to FIGS. 4 and 5, the second heat exchanger 18b is coupled to the horizontal rails 46a and 46b of the frame 14 such that the second end 62b of the heat exchanger 18b is adjacent the second end 62a of the first heat exchanger 18a and the first end 60a of the first heat exchanger 18a is spaced a distance 82 (FIG. 5) from the first end 60b of the second heat exchanger 18b. Also, the second heat exchanger 18b is inclined with respect to the longitudinal axis 28 of the frame 14. The air outlet face 70b of the second heat exchanger 18b substantially faces the lateral side 38 of the frame 14 and the air inlet face 68b substantially faces the opposite lateral side 40. Meanwhile, the air outlet face 70a of the first heat exchanger 18a substantially faces the lateral side 40 and the air inlet face 68a substantially faces the opposite lateral side 38. Therefore, the longitudinal axis 76a of the first heat exchanger 18a intersects the longitudinal axis 76b of the second heat exchanger 18b to define an angle 84 and a generally 'V' shaped configuration. In the illustrated embodiment, the angle 84 is about 15 degrees. In other embodiments, the angle 84 can be between no less than about 10 degrees and/or can be no greater than about 20 degrees. In yet other embodiments, the angle 84 can be no less than about 6 degrees and/or can be no greater than about 40 degrees. The third and fourth heat exchangers 18c and 18d are arranged similar to the first and second heat exchangers 18a, 18b as illustrated in FIGS. 4 and 5.

With the heat exchanger orientation just described, the air conditioner 10 can be constructed to have a compact and space-saving arrangement while (contrary to expectations) still providing good cooling performance results with the heat exchangers 18a-18d oriented at a relatively small angle of incidence to incoming and exiting airflow.

Referring to FIGS. 5 and 6, an "air inlet area" for the first and second heat exchangers 18a, 18b is defined as the distance 82 multiplied by the width 74a of the air inlet face 68a, wherein the area is taken in a plane perpendicular to the airflow direction 58, or in a horizontal plane. Also, a "total air inlet face area" for the heat exchangers 18a, 18b is the length 72 multiplied by the width 74 multiplied by the number of heat exchangers (i.e., two heat exchangers 18a, 18b). Lastly, a "cooling area ratio" is defined as a total air inlet face area divided by the air inlet area. In the illustrated embodiment, this cooling area ratio is about 7.8. Alternatively stated, the size of the air inlet face area is 7.8 times more than the air inlet area, which is a reflection of the compact nature of the air conditioner 10 of the present invention. In other embodiments, the cooling area ratio is no less than about 5 and/or is no greater than about 10. In yet other embodiments, the cooling area ratio is no less than about 3 and/or is no greater than about 12.

The heat exchangers 18c and 18d are arranged relative to each other the same as the heat exchangers 18a and 18b, and therefore the arrangement of the heat exchangers 18c and 18d will not be described in detail.

In the illustrated embodiment, the heat exchangers 18a, 18b, 18c, and 18d are all round tube plate fin heat exchangers. In other embodiments however, other types of heat exchangers (for example, parallel-flow microchannel heat exchangers) can be utilized.

Air filters 88, which are pleated air filters in the illustrated embodiment, can be located adjacent the air inlet faces 68a, 68b, 68c, and 68d of the heat exchangers 18a, 18b, 18c, and 18d. Alternatively or in addition, suitable fixtures relative to the heat exchanger 18a-18d can be provided to removably position filters 88 adjacent the air outlet faces 70a-70d of the heat exchangers 18a-18d. In the illustrated embodiment, the filters 88 extend parallel to the adjacent inlet faces 68a, 68b, 68c, 68d. This arrangement of the filters 88 allows the total area of the filters to be about the same as the total area of the inlet faces 68a-68d and the filter area is maximized. Therefore, the pressure drop across the filters 88 is minimized.

Referring to FIG. 5, the air conditioner 10 further includes a cooling medium distribution system 90 that distributes cooling medium between the chiller system and the heat exchangers 18a-18d. The distribution system 90 includes an inlet header 92 and an outlet header 94. A supply conduit 96 is in fluid communication with the inlet header 92 and each of the heat exchangers 18a-18d to supply the cooling medium to the heat exchangers 18a-18d from the inlet header 92. A discharge conduit 98 is in fluid communication with the outlet header 94 and each of the heat exchangers 18a-18d to transport the cooling medium from the heat exchangers 18a-18d to the outlet header 94. In the illustrated embodiment, the distribution system 90 is a single circuit distribution system. In other embodiments, a dual circuit configuration can be used, such as where a second set of inlet and outlet headers are at the rear 36 of the frame 14 supply and discharge a portion (e.g., half) of the tubes of the heat exchangers 18a-18d, leaving the headers 92 and 94 to supply and discharge the remainder of the tubes of the heat exchangers 18a-18d. Other locations for the headers 92, 94 relative to the heat exchangers 18a-18d are possible (e.g., extending horizontally along and adjacent the lateral sides 38, 40 of the frame 14, and the like).

In some embodiments, the cooling medium is water, whereas in other embodiments the cooling medium can include a mixture of water and glycol. In yet other embodiments, the cooling medium can be a direct expansion refrigerant such as R410a, R134a, or other known refrigerants. In yet other embodiments other types of cooling mediums can be utilized.

In operation, the chiller system cools the cooling medium and the cooling medium is supplied to the inlet header 92.

The supply conduits 96 transport the cooling medium from the header 92 to each of the heat exchangers 18a-18d. Meanwhile, the fan 16 draws air from the room through the air inlet 30 and generates an airflow into the air conditioner 10 in the direction of arrow 58 and across the heat exchangers 18a-18d. The heat exchangers 18a-18d transfer heat from the airflow to the relatively cold cooling medium to cool the airflow. The airflow travels through the fan 16 before being exhausted back to the room through the air outlet 32. The cooling medium, after being heated by the airflow, travels into the outlet header 94 via the discharge conduits 98 and is routed back to the chiller system to be re-cooled.

Figure 9:
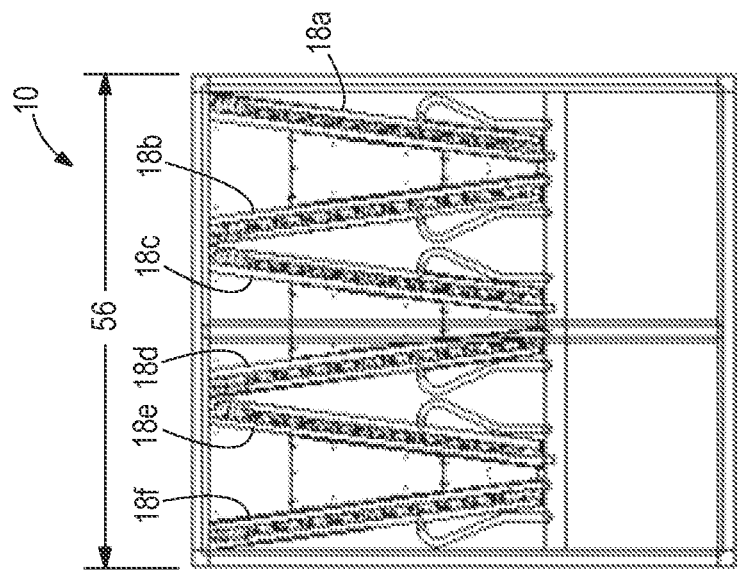
FIG. 9 is a front side view of the air conditioner of FIG. 1 in a third modular configuration.
Figure 8:
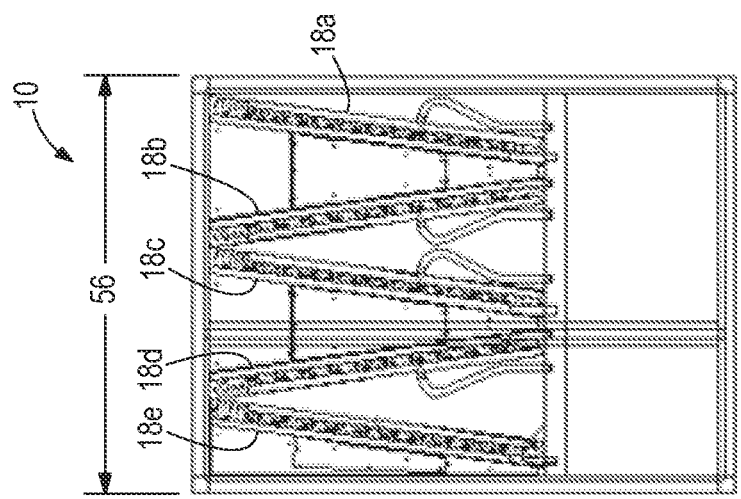
FIG. 8 is a front side view of the air conditioner of FIG. 1 in a second modular configuration.
Figure 7:
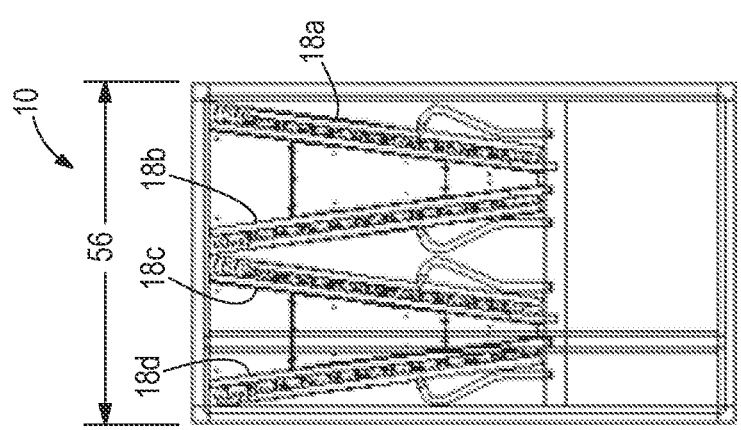
FIG. 7 is a front side view of the air conditioner of FIG. 1 with the front panel and the door removed showing the air conditioner in a first modular configuration.

Referring to FIGS. 7-9, the air conditioner 10 (FIG. 7) described above can be used as part of a modular air conditioner system. If additional cooling capacity is desired, additional heat exchangers 18 can easily be added to the modular air conditioner system to increase the cooling capacity. For example, the air conditioner system has a first modular configuration (FIG. 7) where the air conditioner 10 includes a first set of heat exchangers 18a-18d. A heat exchanger 18e of a second set (FIG. 8) can be added by increasing the width 56 of the frame 14 while the depth 54 and the height 52 remain the same. In the configuration of FIG. 8, the second set includes only a single heat exchanger 18e, which is essentially the same as each of the heat exchangers 18a-18d described above. In another configuration (FIG. 9) the second set of heat exchangers can include two heat exchangers 18e and 18f, again with each of the additional heat exchangers 18e, 18f being the same as those described above. In this manner, the air conditioner 10 can be readily adapted to have any number of heat exchangers 18 to increase or decrease the cooling capacity of the air conditioner 10 while using a single heat exchanger type and size (i.e., without the need for heat exchangers 18 that vary in size for different capacity air conditioners 10). This unique utilization and arrangement of heat exchangers also permits the air conditioner 10 to have a standardized depth 54 and a variable width 56 to define multiple air conditioner models with different capacities, all using a high number of standardized components (e.g., heat exchangers 18) and a low number of unique components.

The inclined configuration of the heat exchangers 18a-18f and the modular configuration described herein also allows for a relatively large number of heat exchangers 18 per unit of width 56 of the air conditioner. For example, in the configuration of FIG. 7, there are four heat exchangers 18a-18d in a total width 56 of about 1200 millimeters, which is one heat exchanger per 300 millimeters of width. In other embodiments, the heat exchangers 18a-18d can be inclined such that there is no less than about one heat exchanger per 350 millimeters of width 56 of the frame 14 to provide an excellent balance of heat exchanger density and relatively small frame size.

Various features and advantages of the invention are set forth in the following claims.

What is claimed is:

1. An air conditioner comprising:
a frame at least partially defining an air inlet and an air outlet, the frame including an upper end and a lower end, the lower end configured to support the frame on a support surface;
a fan operable to generate an airflow that moves in an airflow direction from the air inlet to the air outlet;
a first heat exchanger including a first end adjacent the air inlet, a second end adjacent the air outlet, an air inlet face that extends between the first end and the second end, an air outlet face that extends between the first end and the second end and faces opposite the air inlet face, and a longitudinal axis that extends through the first end and the second end between the air inlet face and the air outlet face, the first heat exchanger configured to transfer heat between the airflow and a cooling medium; and
a first air filter adjacent to the air inlet face and parallel to the air inlet face,
wherein a total area of the first air filter approximately equals a total air inlet face area of the first heat exchanger,
wherein the total air inlet face area of the first heat exchanger is defined by a width and a length of the air inlet face of the first heat exchanger,
wherein a first heat exchanger angle is defined between the longitudinal axis of the heat exchanger and the airflow direction, and
wherein the first heat exchanger angle is between about 3 degrees and about 20 degrees.

2. The air conditioner of claim 1, wherein the first heat exchanger angle is between about 5 degrees and about 10 degrees.

3. The air conditioner of claim 1, wherein the first heat exchanger angle is about 7.5 degrees.

4. The air conditioner of claim 1, further comprising:
a second heat exchanger including a first end adjacent the air inlet, a second end adjacent the air outlet, an air inlet face that extends between the first and second ends of the second heat exchanger, an air outlet face that extends between the first and second ends of the second heat exchanger and faces opposite the air inlet face of the second heat exchanger, and a longitudinal axis that extends through the first and second ends of the second heat exchanger and between the air inlet and air outlet faces of the second heat exchanger, the second heat exchanger configured to transfer heat between the airflow and the cooling medium;
an intermediate panel extending from the air inlet face of the first heat exchanger to the air inlet face of the second heat exchanger; and
a second air filter adjacent to the air inlet face of the second heat exchanger and parallel to the air inlet face of the second heat exchanger,
wherein a total area of the second air filter approximately equals a total air inlet face area of the second heat exchanger,
wherein the total air inlet face area of the second heat exchanger is defined by a width and a length of the air inlet face of the second heat exchanger,
wherein a second heat exchanger angle is defined between the longitudinal axis of the second heat exchanger and the air flow direction, and
wherein the second heat exchanger angle is between about 3 degrees and about 20 degrees.

5. The air conditioner of claim 4, wherein the first heat exchanger angle is between about 5 degrees and about 10 degrees, and wherein the second heat exchanger angle is between about 5 degrees and about 10 degrees.

6. The air conditioner of claim 4, wherein the second end of the first heat exchanger is adjacent the second end of the second heat exchanger and the first end of the first heat exchanger is spaced from the first end of the second heat exchanger such that the longitudinal axis of the first heat exchanger and the longitudinal axis of the second heat exchanger intersect.

7. The air conditioner of claim 6, wherein a third heat exchanger angle is defined between the longitudinal axis of the first heat exchanger and the longitudinal axis of the second heat exchanger, and wherein the third heat exchanger angle is between about 10 degrees and about 20 degrees.

8. An air conditioner comprising:
a frame at least partially defining an air inlet and an air outlet, the frame including an upper end, a lower end opposite the upper end, a longitudinal axis that extends through the upper end and the lower end, and a first plurality of horizontal rails at the air inlet, the lower end configured to support the frame on a support surface such that the longitudinal axis is perpendicular to the support surface;
a fan operable to generate an airflow that moves in an airflow direction from the air inlet to the air outlet; and
a heat exchanger including a first end adjacent the air inlet, a second end within the frame, an air inlet face that extends between the first end and the second end, an air outlet face that extends between the first end and the second end and faces opposite the air inlet face, and a longitudinal axis that extends through the first end and the second end and between the air inlet face and the air outlet face, the first heat exchanger configured to transfer heat between the airflow and a cooling medium,
wherein the heat exchanger extends within the frame from at least one of the first plurality of horizontal rails,
wherein the fan is located between the air outlet and the air outlet face of the heat exchanger, and
wherein a first heat exchanger angle is defined between the longitudinal axis of the heat exchanger and the longitudinal axis of the frame, and
wherein the first heat exchanger angle is between about 3 degrees and about 20 degrees.

9. The air conditioner of claim 8, wherein the first heat exchanger angle is between about 5 degrees and about 10 degrees.

10. The air conditioner of claim 8, further comprising an air filter adjacent the air inlet face and parallel to the air inlet face.

11. The air conditioner of claim 8, wherein the heat exchanger is a first heat exchanger, the air conditioner further comprising:
a second heat exchanger including a first end adjacent the air inlet, a second end adjacent the air outlet, an air inlet face that extends between the first and second ends of the second heat exchanger, an air outlet face that extends between the first and second ends of the second heat exchanger and faces opposite the air inlet face of the second heat exchanger, and a longitudinal axis that extends through the first and second ends of the second heat exchanger and between the air inlet and air outlet faces of the second heat exchanger, the second heat exchanger configured to transfer heat between the airflow and the cooling medium,
wherein a second heat exchanger angle is defined between the longitudinal axis of the second heat exchanger and the longitudinal axis of the frame, and
wherein the second heat exchanger angle is between about 3 degrees and about 20 degrees.

12. The air conditioner of claim 11, wherein the first heat exchanger angle is between about 5 degrees and about 10 degrees, and wherein the second heat exchanger angle is between about 5 degrees and about 10 degrees.

13. The air conditioner of claim 11, wherein the second end of the first heat exchanger is adjacent the second end of the second heat exchanger and the first end of the first heat exchanger is spaced from the first end of the second heat exchanger such that the longitudinal axis of the first heat exchanger and the longitudinal axis of the second heat exchanger intersect.

14. The air conditioner of claim 13, wherein a third heat exchanger angle is defined between the longitudinal axis of the first heat exchanger and the longitudinal axis of the second heat exchanger, and wherein the third heat exchanger angle is between about 10 degrees and about 20 degrees.

15. The air conditioner of claim 11, further comprising:
a third heat exchanger including a first end adjacent the air inlet, a second end adjacent the air outlet, an air inlet face that extends between the first and second ends of the third heat exchanger, an air outlet face that extends between the first and second ends of the third heat exchanger and faces opposite the air inlet face of the third heat exchanger, and a longitudinal axis that extends through the first and second ends of the third heat exchanger and between the air inlet and the air outlet faces of the third heat exchanger, the third heat exchanger configured to transfer heat between the airflow and the cooling medium,
wherein a fourth heat exchanger angle is defined between the longitudinal axis of the third heat exchanger and the longitudinal axis of the second heat exchanger, and
wherein the fourth heat exchanger angle is equal to the third heat exchanger angle.

16. A modular air conditioner system comprising:
a fan operable to generate an airflow;
first and second sets of heat exchangers, each heat exchanger of the first and second sets being the same size, being oriented at an angle no less than about 3 degrees and no greater than about 20 degrees from a vertical plane, having an air inlet face into which the airflow enters the heat exchanger, and having an air outlet face opposite the air inlet face and from which the airflow exits the heat exchanger;
a frame at least partially defining an air inlet and an air outlet, the frame including
an upper end,
a lower end opposite the upper end,
a front,
a rear opposite the front,
lateral sides extending between and connecting the front and rear,
an interior defined at least in part between the front and the rear of the frame and within which the heat exchangers are located, and
a door at the front through which access to the interior of the frame is provided;
a first modular configuration in which the frame has a first height, a first depth, and a first width defined by and between the lateral sides of the frame, and in which only the first set of heat exchangers is installed, and in which the heat exchangers of the first set are arranged side-by-side with the air inlet and outlet faces of each heat exchanger substantially facing the lateral sides of the frame; and
a second modular configuration in which the frame has the first height, the first depth, and a second width that is defined by and between the lateral sides of the frame and that is greater than the first width to accommodate both the first and second sets of heat exchangers, wherein in the second configuration the heat exchangers of the first and second sets are arranged side-by-side with the air inlet and outlet faces of each heat exchanger substantially facing the lateral sides of the frame, and wherein at least one heat exchanger of the second set is oriented at substantially the same angle from the vertical plane as one of the heat exchangers of the first set, wherein the modular air conditioner system is configured in either the first configuration or the second configuration.

17. The modular air conditioner system of claim 16, wherein each of the first and second sets of heat exchangers are orientated at no less than about 10 degrees and no greater than about 20 degrees from the vertical plane.

18. The modular air conditioner system of claim 16, wherein the second set includes a single heat exchanger.

19. An air conditioner comprising:

a frame at least partially defining an air inlet and an air outlet, the frame including an upper end, a lower end opposite the upper end, a front, a rear opposite the front, opposite lateral sides extending between and connecting the front and the rear to define a width of the frame, and a longitudinal axis that extends through the upper end and the lower end, the lower end configured to support the frame on a support surface such that the longitudinal axis is perpendicular to the support surface;

at least one door attached to the frame and extended between the upper end and the lower end;

a fan operable to generate an airflow that moves in an airflow direction from the inlet to the outlet;

a plurality of heat exchangers each including a first end adjacent the air inlet, a second end adjacent the air outlet, an air inlet face that extends between the first end and the second end, an air outlet face that extends between the first end and the second end and faces opposite the air inlet face, and a longitudinal axis that extends through the first end and the second end and between the air inlet face and the air outlet face, each heat exchanger configured to transfer heat between the airflow and a cooling medium; and an intermediate panel extending from the air inlet face of one of the plurality of heat exchangers to the air inlet face of another of the plurality of heat exchangers, wherein each heat exchanger is inclined with respect to the longitudinal axis of the frame; and wherein the heat exchangers are arranged side-by-side with the air inlet and outlet faces of each heat exchanger substantially facing the lateral sides of the frame, and wherein the plurality of heat exchangers includes at least one heat exchanger per 350 millimeters of width across the frame.

20. The air conditioner of claim 19, wherein the plurality of heat exchangers includes at least one heat exchanger per 300 millimeters of width across the frame.

21. The air conditioner of claim 4, further comprising an air inlet area for the first and second heat exchangers, the air inlet area defined by a distance between the air inlet face of the first heat exchanger at the first end of the first heat exchanger and the air inlet face of the second heat exchanger at the first end of the second heat exchanger and by the width of the air inlet face of one of the first heat exchanger or the second heat exchanger, wherein a cooling area ratio is defined by dividing a sum of the total air inlet face area of the first heat exchanger and the total air inlet face area of the second heat exchanger by the air inlet area, and wherein the cooling air ratio is greater than or equal to 5.

22. The air conditioner of claim 8, wherein the frame includes a second plurality of horizontal rails located between the air inlet and the air outlet and wherein the heat exchanger extends to at least one of the second plurality of horizontal rails.

23. The air conditioner of claim 8, including at least one door attached to the frame and extended between the upper end and the lower end.

24. The air conditioner of claim 19, wherein each heat exchanger of the plurality of heat exchangers includes a supply conduit in fluid communication with an inlet header of the air conditioner and a discharge conduit in fluid communication with an outlet header of the air conditioner, wherein the supply conduit of each heat exchanger is arranged adjacent to the air inlet face of the heat exchanger and extends substantially from the bottom of the heat exchanger to the top of the heat exchanger, wherein the discharge conduit of each heat exchanger is arranged adjacent to the air outlet face of the heat exchanger, wherein the supply conduit and the discharge conduit of each heat exchanger are oriented parallel to the longitudinal axis of the heat exchanger, and wherein the supply conduit is longer than the discharge conduit.

25. The air conditioner of claim 24, wherein the supply conduit of one of at least two adjacent heat exchangers of the plurality of heat exchangers is arranged adjacent to the supply conduit of the other of the at least two heat exchangers, and wherein the discharge conduits of the at least two adjacent heat exchangers are arranged outside of the supply conduits of the at least two adjacent heat exchangers.

* * * * *

(12) EX PARTE REEXAMINATION CERTIFICATE (13061st)
United States Patent
Andrew et al.

(10) Number: US 9,671,128 C1
(45) Certificate Issued: Oct. 17, 2025

(54) AIR CONDITIONER HAVING ANGLED HEAT EXCHANGERS

(71) Applicant: Airedale International Air Conditioning Limited, Leeds (GB)

(72) Inventors: David Andrew, Leeds (GB); David Wilks, Leeds (GB); Anthony Hoare, Wetherby (GB); Patrick Cotton, Leeds (GB); Andrew Walker, Harrogate (GB)

(73) Assignee: AIREDALE INTERNATIONAL AIR CONDITIONING LIMITED, Leeds (GB)

Reexamination Request:
No. 90/019,831, Jan. 24, 2025

Reexamination Certificate for:
Patent No.: 9,671,128
Issued: Jun. 6, 2017
Appl. No.: 14/380,127
PCT Filed: May 29, 2014
PCT No.: PCT/GB2014/051635
§ 371 (c)(1),
(2) Date: Aug. 21, 2014
PCT Pub. No.: WO2014/207434
PCT Pub. Date: Dec. 31, 2014

(51) Int. Cl.
*B01D 47/00* (2006.01)
*B01D 45/00* (2006.01)
*B01D 46/121* (2022.01)
*B01D 46/42* (2006.01)
*F24F 1/005* (2019.01)
*F24F 1/0063* (2019.01)
*F24F 1/0067* (2019.01)
*F24F 1/0073* (2019.01)
*F24F 13/28* (2006.01)
*F24F 13/30* (2006.01)

(52) U.S. Cl.
CPC ............ *F24F 13/30* (2013.01); *B01D 46/121* (2022.01); *B01D 46/4263* (2013.01); *F24F 1/005* (2019.02); *F24F 1/0063* (2019.02); *F24F 1/0067* (2019.02); *F24F 1/0073* (2019.02); *F24F 13/28* (2013.01)

(58) Field of Classification Search
None
See application file for complete search history.

(56) References Cited

To view the complete listing of prior art documents cited during the proceeding for Reexamination Control Number 90/019,831, please refer to the USPTO's Patent Electronic System.

*Primary Examiner* — Elizabeth L Mckane

(57) ABSTRACT

An air conditioner including a frame, a fan operable to generate an airflow that moves in an airflow direction, and a first heat exchanger including a first end adjacent the air inlet, a second end adjacent the air outlet, an air inlet face that extends between the first end and the second end, an air outlet face that extends between the first end and the second end and faces opposite the air inlet face, and a longitudinal axis that extends through the first end and the second end between the air inlet face and the air outlet face. The heat exchanger is configured to transfer heat between the airflow and a cooling medium. A first heat exchanger angle is defined between the longitudinal axis of the heat exchanger and the airflow direction, and the first heat exchanger angle can be between about 3 degrees and about 20 degrees.

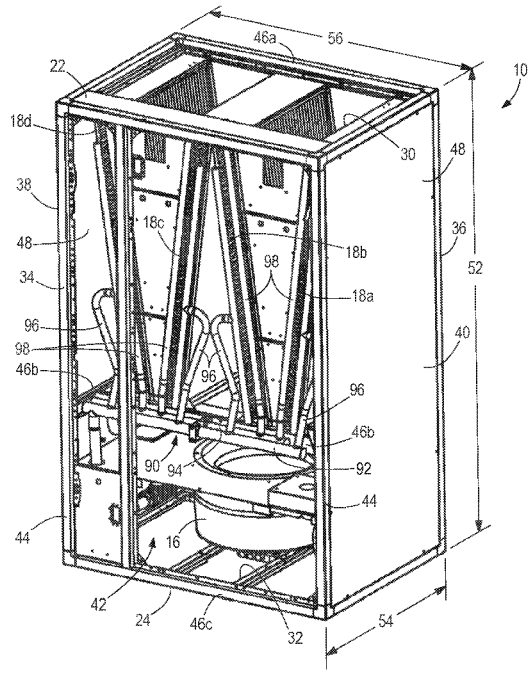

EX PARTE REEXAMINATION CERTIFICATE

THE PATENT IS HEREBY AMENDED AS INDICATED BELOW.

AS A RESULT OF REEXAMINATION, IT HAS BEEN DETERMINED THAT:

Claims 1-13 are cancelled.

Claims 14-25 were not reexamined.

\* \* \* \* \*